United States Patent
Si

(10) Patent No.: US 12,294,988 B2
(45) Date of Patent: May 6, 2025

(54) METHOD AND APPARATUS FOR S-SSB TRANSMISSION AND MEASUREMENT IN UNLICENSED OPERATION

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 17/807,678

(22) Filed: Jun. 17, 2022

(65) Prior Publication Data

US 2023/0007674 A1 Jan. 5, 2023

Related U.S. Application Data

(60) Provisional application No. 63/289,453, filed on Dec. 14, 2021, provisional application No. 63/217,397, filed on Jul. 1, 2021.

(51) Int. Cl.
*H04W 72/1263* (2023.01)
*H04W 16/14* (2009.01)
*H04W 74/0808* (2024.01)

(52) U.S. Cl.
CPC ....... *H04W 72/1263* (2013.01); *H04W 16/14* (2013.01); *H04W 74/0808* (2013.01)

(58) Field of Classification Search
CPC ............. H04W 72/1263; H04W 16/14; H04W 74/0808; H04W 92/18; H04W 72/25;
(Continued)

(56) References Cited

U.S. PATENT DOCUMENTS

2018/0049143 A1* 2/2018 Gupta .................. H04W 16/14
2018/0324678 A1 11/2018 Chen et al.
(Continued)

FOREIGN PATENT DOCUMENTS

EP 3836476 A1 6/2021
WO 2020033088 A1 2/2020
(Continued)

OTHER PUBLICATIONS

Discussion on sidelink synchronization mechanism for NR V2X, 3GPP TSG WG1 #98 meeting, R1-1909307, Aug. 26-30, 2019 (Year: 2019).*

(Continued)

*Primary Examiner* — Tejis Daya

(57) ABSTRACT

A method and apparatus of a user equipment (UE) in a wireless communication system are provided. A method of operating a UE includes receiving a set of configurations; determining, based on the set of configurations, a number $N_{period}^{S\text{-}SSB}$ of sidelink synchronization signals and physical sidelink broadcast channel (S-SS/PSBCH) blocks to transmit in a period; and determining, based on the set of configurations, a transmission window for transmitting the S-SS/PSBCH blocks in the period. The method further includes determining a set of candidate slots for transmitting the S-SS/PSBCH blocks in the transmission window; performing channel access procedures before the set of candidate slots for transmitting the S-SS/PSBCH blocks in the transmission window; and transmitting, to another UE, the S-SS/PSBCH blocks over a sidelink channel with shared channel access, upon successfully performing the channel access procedures.

16 Claims, 12 Drawing Sheets

(58) Field of Classification Search
CPC . H04W 74/0833; H04W 76/14; H04W 24/08; H04W 72/02; H04W 72/0446; H04L 5/0048; H04L 5/0078; H04L 5/0037
See application file for complete search history.

(56) References Cited

U.S. PATENT DOCUMENTS

| | | | |
|---|---|---|---|
| 2020/0084656 A1* | 3/2020 | Nguyen | H04W 74/0808 |
| 2020/0245272 A1* | 7/2020 | Hong | H04W 56/001 |
| 2022/0150877 A1 | 5/2022 | Ko et al. | |
| 2022/0174672 A1 | 6/2022 | Ko et al. | |
| 2023/0300862 A1* | 9/2023 | Hwang | H04L 5/0053 |
| 2024/0057043 A1* | 2/2024 | Fouad | H04L 5/0023 |

FOREIGN PATENT DOCUMENTS

| | | |
|---|---|---|
| WO | 2021029723 A1 | 2/2021 |
| WO | 2021075829 A1 | 4/2021 |

OTHER PUBLICATIONS

Feature lead summary on AI 7.2.4.3 #2 Sidelink synchronization mechanism, 3GPP TSG RAN WG1 Meeting #100bis, R1-2002396, Apr. 20-30, 2020. (Year: 2020).*

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Oct. 25, 2022 regarding International Application No. PCT/KR2022/009438, 7 pages.

ZTE et al., "Discussion on resource allocation for power saving", 3GPP TSG RAN WG1 #105-e e-Meeting, R1-2105614, May 2021, 11 pages.

Extended European Search Report issued Aug. 2, 2024 regarding Application No. 22833671.5, 10 pages.

* cited by examiner

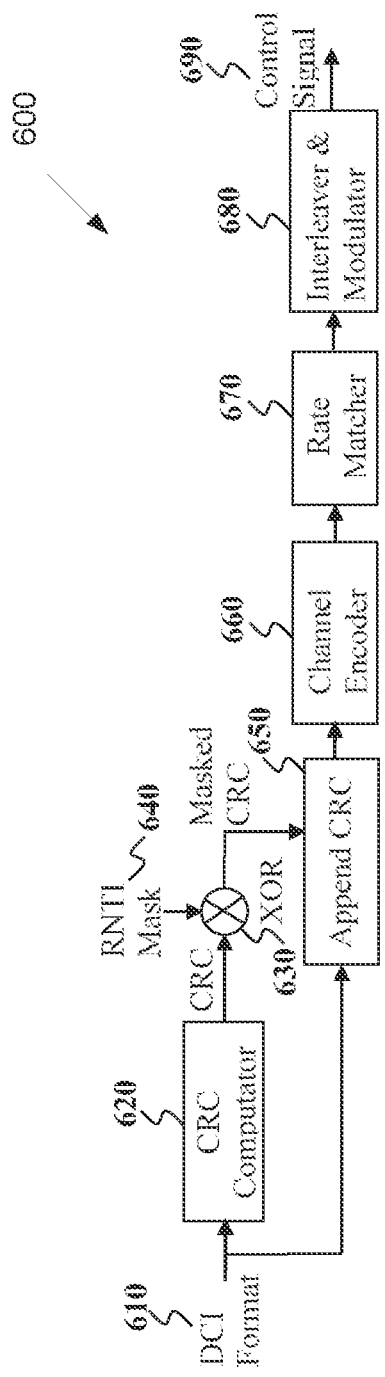
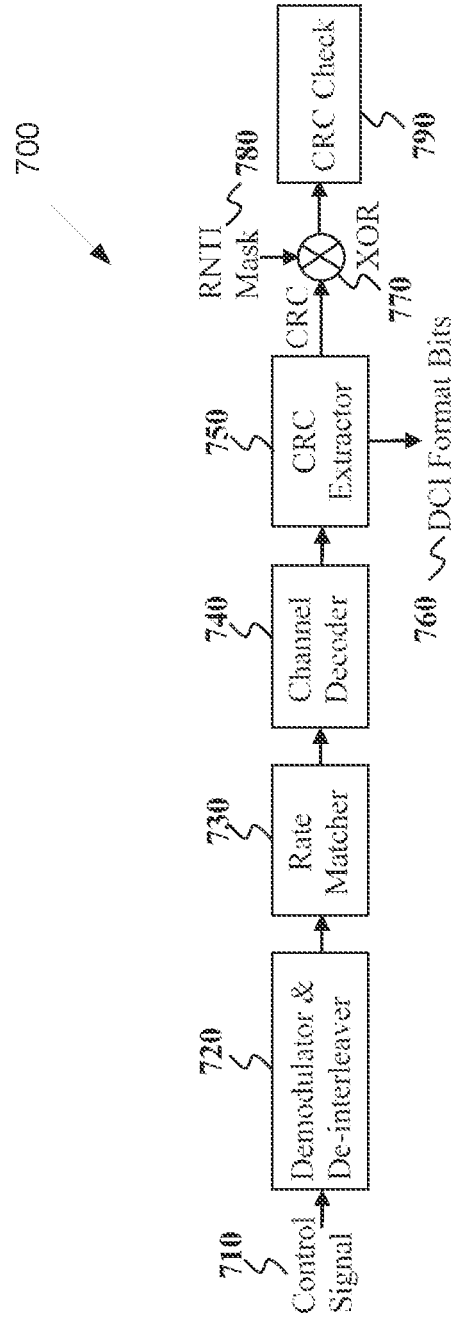
FIG. 6
FIG. 7

METHOD AND APPARATUS FOR S-SSB TRANSMISSION AND MEASUREMENT IN UNLICENSED OPERATION

CROSS-REFERENCE TO RELATED APPLICATIONS AND CLAIM OF PRIORITY

The present application claims priority to:
U.S. Provisional Patent Application No. 63/217,397, filed on Jul. 1, 2021; and
U.S. Provisional Patent Application No. 63/289,453, filed on Dec. 14, 2021.
The content of the above-identified patent documents is incorporated herein by reference.

TECHNICAL FIELD

The present disclosure relates generally to wireless communication systems, more specifically, the present disclosure relates to sidelink synchronization signals and physical sidelink broadcast channel block (S-SS/PSBCH block or S-SSB) transmission and measurement in unlicensed spectrum.

BACKGROUND

A communication system includes a downlink (DL) that conveys signals from transmission points such as base stations (BS s) or NodeBs to user equipments (UEs) and an uplink (UL) that conveys signals from UEs to reception points such as NodeBs. A UE may also communicate with another UE via a sidelink (SL). A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a 5G or advanced 5G communication system to be provided for an S-SSB transmission and measurement in unlicensed spectrum.

In one embodiment, a UE in a wireless communication system is provided. The UE comprises a transceiver configured to receive a set of configurations. The UE further comprises a processor operably coupled to the transceiver. The processor is configured to determine, based on the set of configurations, a number $N_{period}^{S-SSB}$ of S-SS/PSBCH blocks to transmit in a period; determine, based on the set of configurations, a transmission window for transmitting the S-SS/PSBCH blocks in the period; determine a set of candidate slots for transmitting the S-SS/PSBCH blocks in the transmission window; and perform channel access procedures before the set of candidate slots for transmitting the S-SS/PSBCH blocks in the transmission window. Upon successfully performing the channel access procedures, the transceiver is further configured to transmit, to another UE, the S-SS/PSBCH blocks over a SL channel with shared channel access.

In another embodiment, a method of a UE in a wireless communication system is provided. The method comprises receiving a set of configurations. The method further includes determining, based on the set of configurations, a number $N_{period}^{S-SSB}$ of S-SS/PSBCH blocks to transmit in a period; determining, based on the set of configurations, a transmission window for transmitting the S-SS/PSBCH blocks in the period and determining a set of candidate slots for transmitting the S-SS/PSBCH blocks in the transmission window. The method further includes performing channel access procedures before the set of candidate slots for transmitting the S-SS/PSBCH blocks in the transmission window and transmitting, to another UE, the S-SS/PSBCH blocks over a SL channel with shared channel access, upon successfully performing the channel access procedures.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example encoding process for a downlink control information (DCI) format according to embodiments of the present disclosure;

FIG. 7 illustrates an example decoding process for a DCI format for use with a UE according to embodiments of the present disclosure;

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v 16.1.0, "NR; Physical channels and modulation;" 3GPP TS 38.212 v 16.1.0, "NR; Multiplexing and Channel coding;" 3GPP TS 38.213 v 16.1.0, "NR; Physical Layer Procedures for Control;" 3GPP TS 38.214 v 16.1.0, "NR; Physical Layer Procedures for Data;" and 3GPP TS 38.331 v 16.1.0, "NR; Radio Resource Control (RRC) Protocol Specification."

Figure 1:
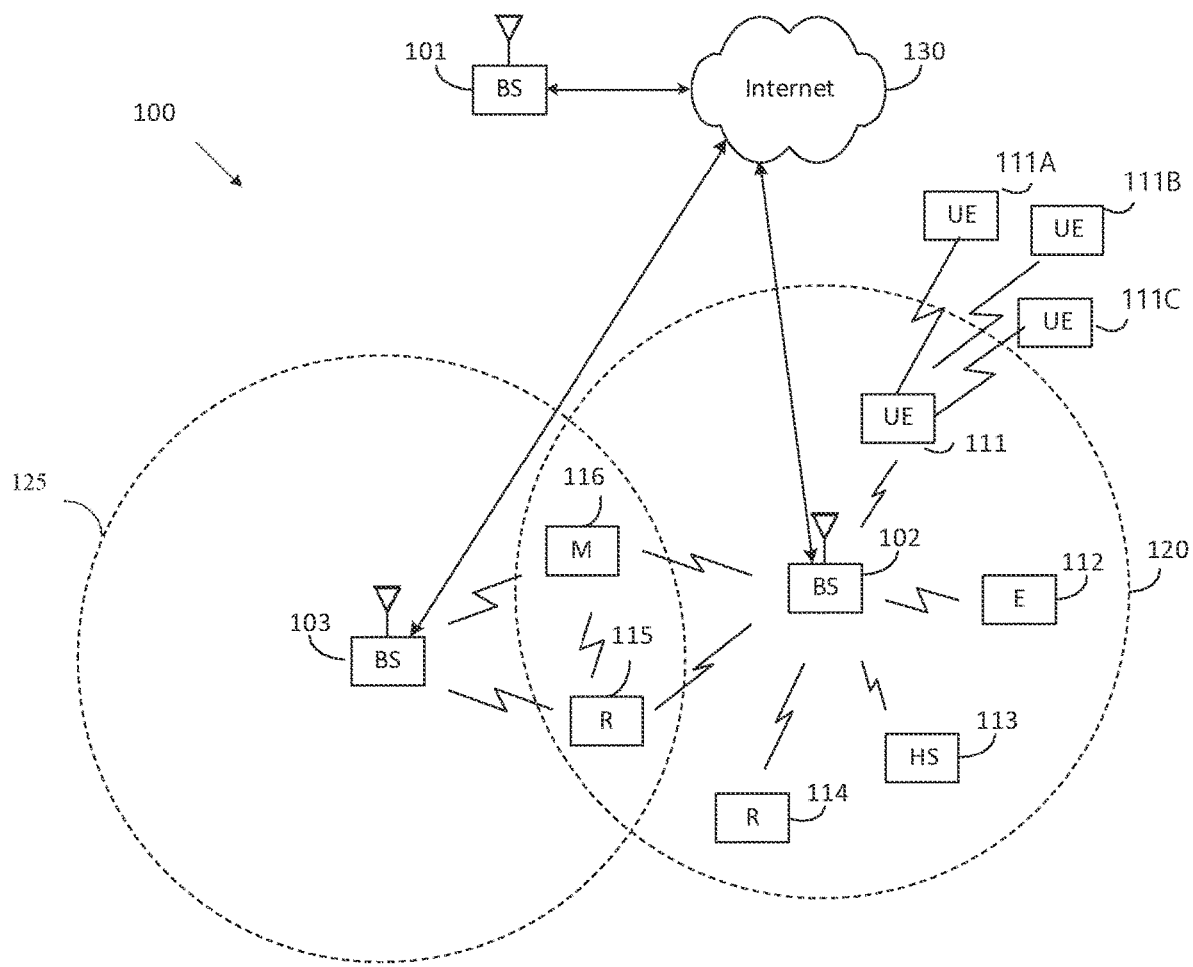
FIG. 1 illustrates an example wireless network according to embodiments of the present disclosure.
Figure 2:
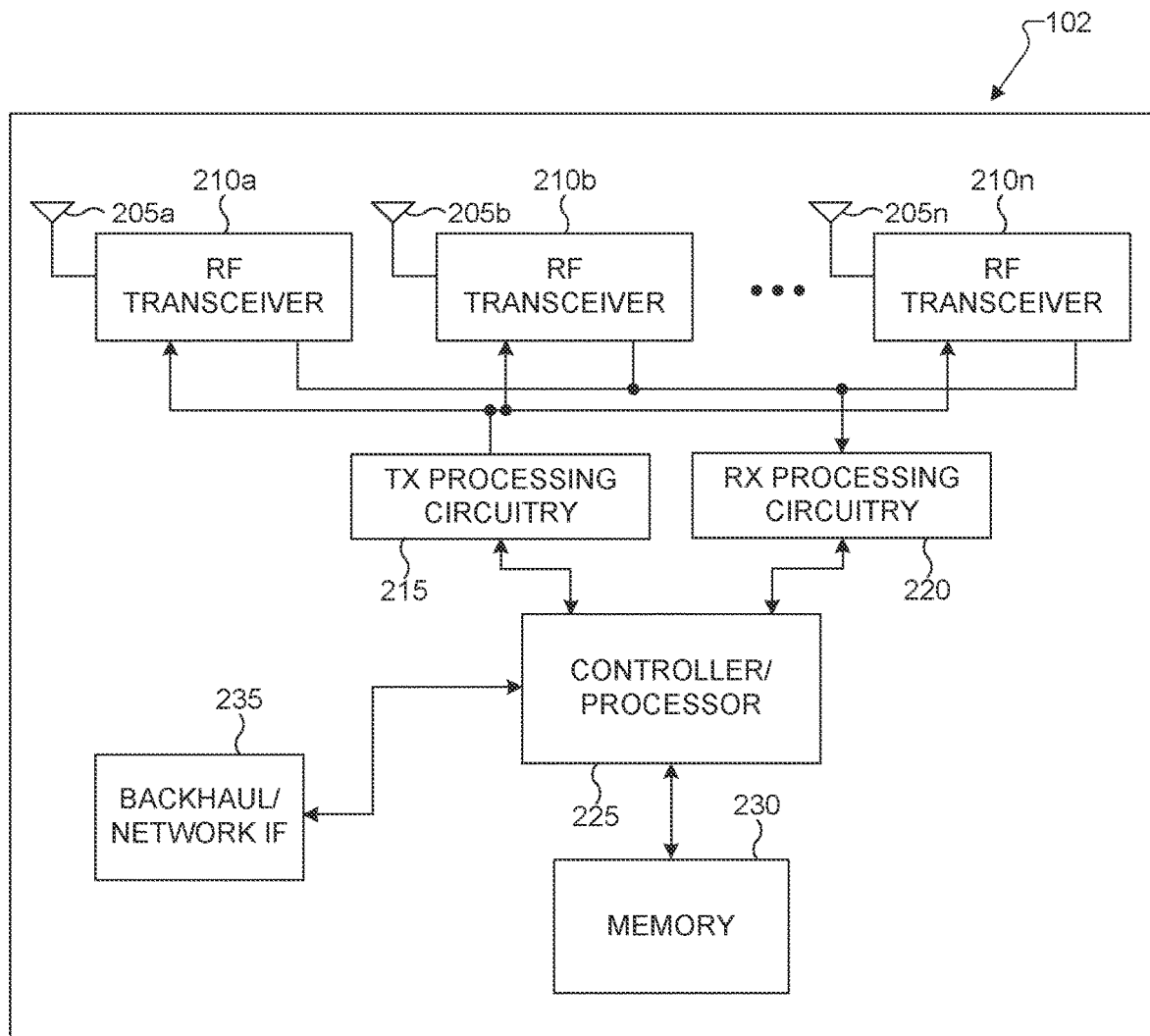
FIG. 2 illustrates an example gNB according to embodiments of the present disclosure.
Figure 3:
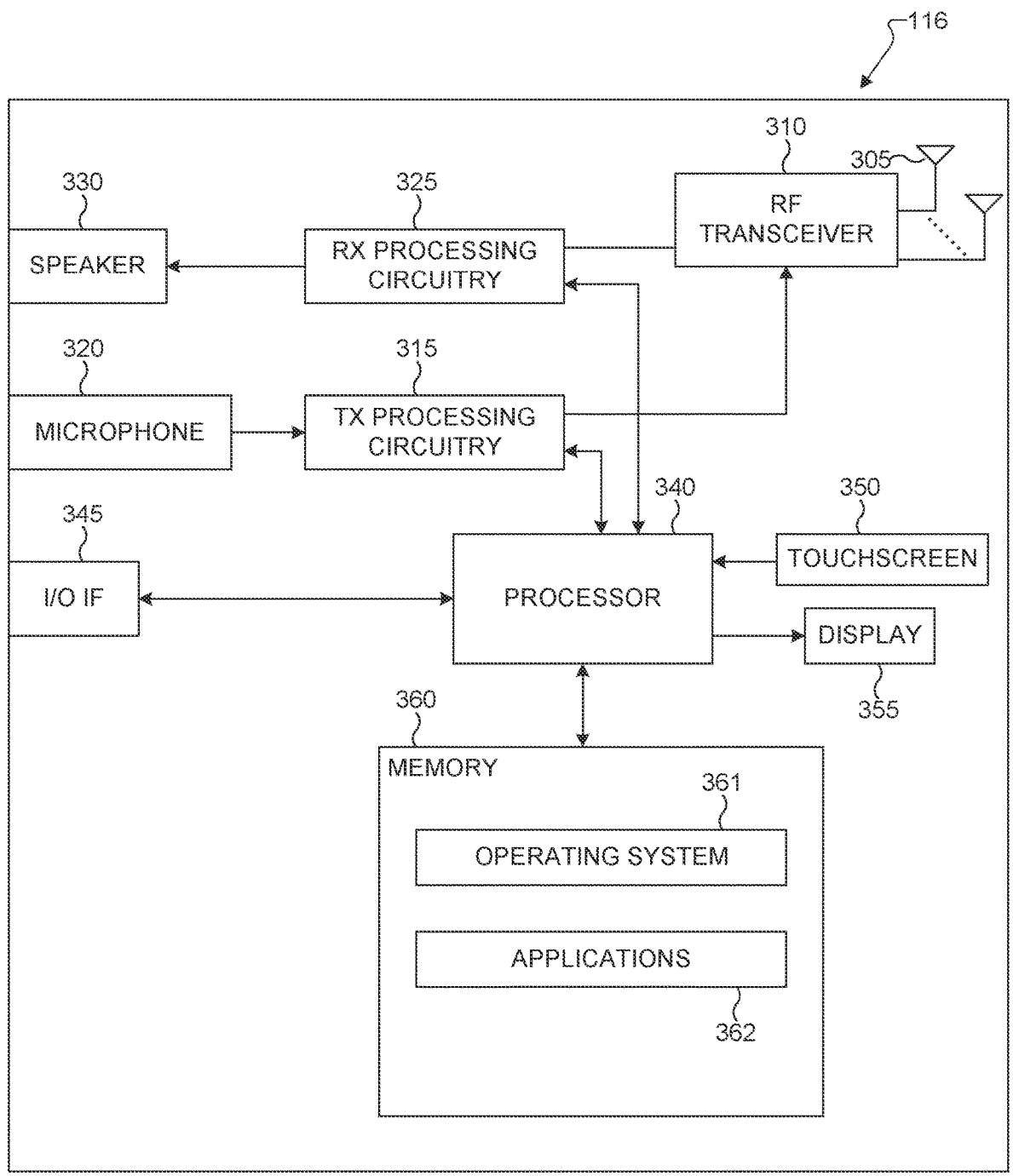
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In various embodiments, a UE 116 may communicate with another UE 115 via a SL. For example, both UEs 115-116 can be within network coverage (of the same or different base stations). In another example, the UE 116 may be within network coverage and the other UE may be outside network coverage (e.g., UEs 111A-111C). In one embodiment 111 may be a femto BS and can communicate with UEs 111A, 111B, and 111c. The UEs 111A to 111C can communicate with the BS 102 through the 111. In yet another example, both UE are outside network coverage (e.g., UEs 111A-111C). In some embodiments, the UEs 111A-111C may use a device to device (D2D) interface called PC5 (e.g., also known as SL at the physical layer) for communication between the UEs. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to S-SSB transmission and measurement in unlicensed spectrum. A communication system includes a DL that refers to transmissions from a base station or one or more transmission points to UEs and an UL that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G, advanced 5G or pre-5G communication system is also called a "beyond 4G network" or a "post LTE system." The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DCI formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TB s) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an OFDM waveform including a variant using DFT preceding that is known as DFT-spread-OFDM.

Figure 4:
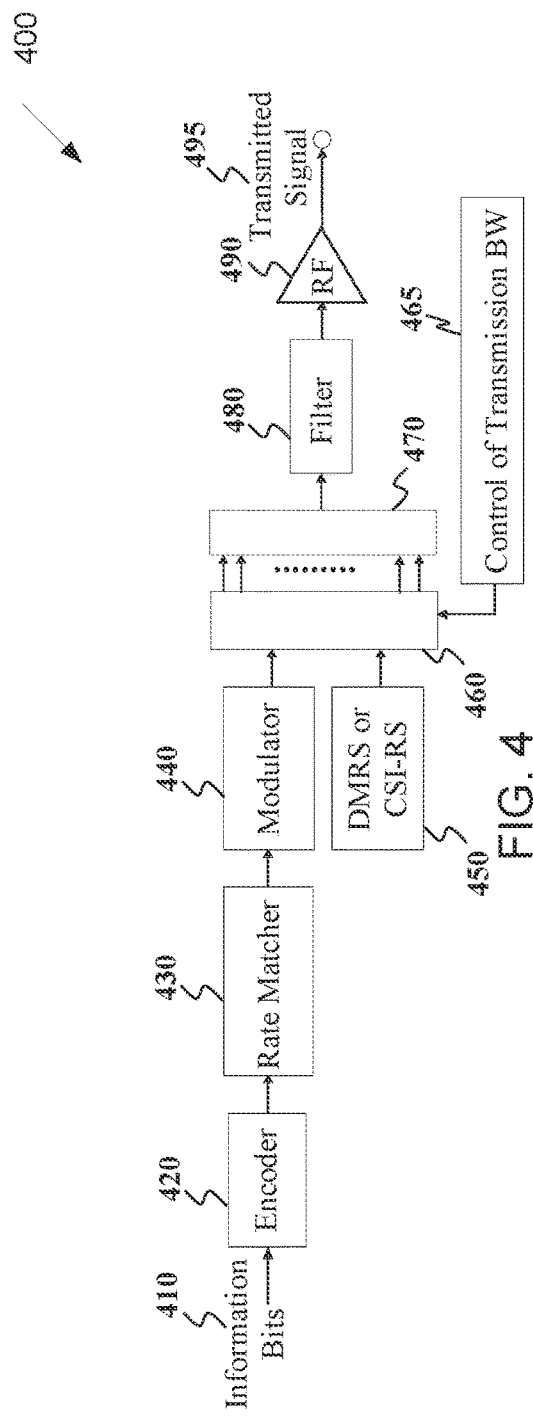
FIG. 4 illustrates an example transmitter structure using orthogonal frequency division multiplexing (OFDM) according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
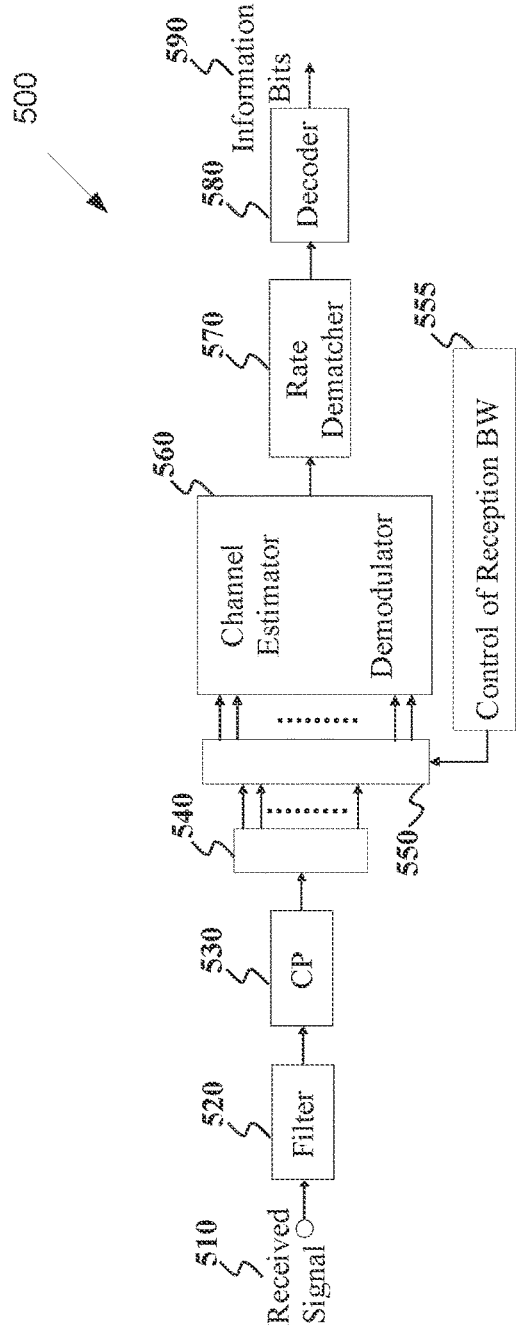
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Traditionally, cellular communication networks have been designed to establish wireless communication links between mobile user equipments (UEs) and fixed communication infrastructure components (such as base stations (BS s) or access points (APs)) that serve UEs in a wide or local geographic range. However, a wireless network can also be implemented by utilizing only device-to-device (D2D) communication links without the need for fixed infrastructure components. This type of network is typically referred to as an "ad-hoc" network.

A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles or other infrastructure or UEs. Such a network is referred to as a vehicle-to-everything (V2X) network. Multiple types of communication links can be supported by nodes supporting V2X in the network and can utilize same or different protocols and systems.

Figure 8:
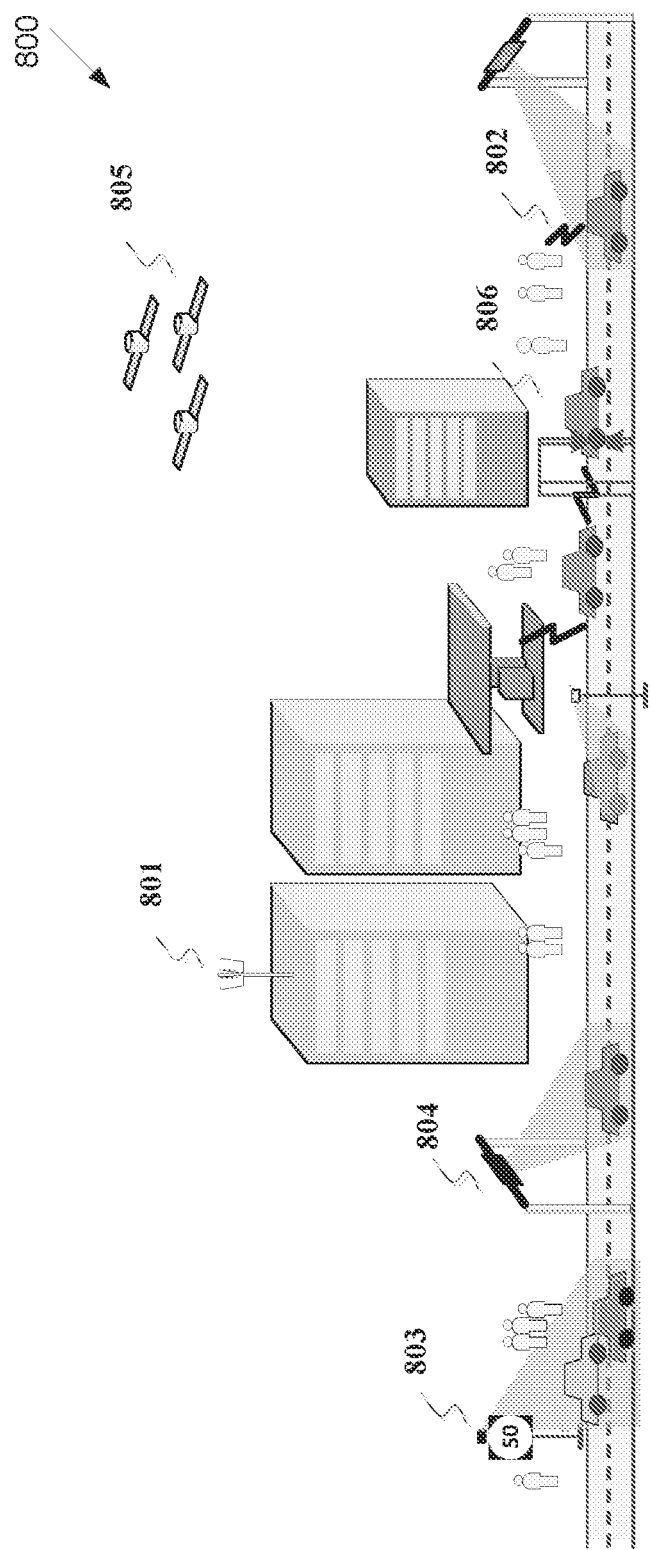
FIG. 8 illustrates an example use case of a vehicle-centric communication network according to embodiments of the present disclosure.

FIG. 8 illustrates an example use case of a vehicle-centric communication network 800 according to embodiments of the present disclosure. An embodiment of the use case of a vehicle-centric communication network 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

FIG. 8 illustrates an example use case of a vehicle-centric communication network according to illustrative embodiments of the present disclosure.

The vehicular communication, referred to as vehicle-to-everything (V2X), contains the following three different types: 1) vehicle-to-vehicle (V2V) communications; 2) vehicle-to-infrastructure (V2I) communications; and 3) vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

V2X communications can be used to implement several types of services, that are complementary to a primary communication network, or to provide new services based on a flexibility of a network topology. V2X can support unicasting, broadcasting, or group/multicasting as potential means for V2V communication 800 where vehicles can transmit messages to all in-range V2V-enabled devices or to a subset of devices that are members of a particular group. V2X can support V2I communication 801 between one or more vehicles and an infrastructure node to provide cellular connectivity as well as specialized services related to control and safety of vehicular traffic. V2X can also support V2P communication 802, for example to provide safety services for pedestrians or traffic management services. V2X multicast communication 803 can be used to provide safety and control messages to a large number of vehicles in a spectrally efficient manner.

While vehicle devices can support several different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 804 can be supported such as, for example, traffic tracking beacons. Satellite-based communication 805 can also be supported for V2X networks for communication or positioning services.

Direct communication between vehicles in V2V is based on a SL interface. SL is the UE-to-UE interface for SL communication and SL discovery. The SL corresponds to the PC5 interface. SL communication is defined as a functionality enabling proximity services (ProSe) Direct Communication 806 between two or more nearby UEs using wireless technology but not traversing any network node.

Figure 9:
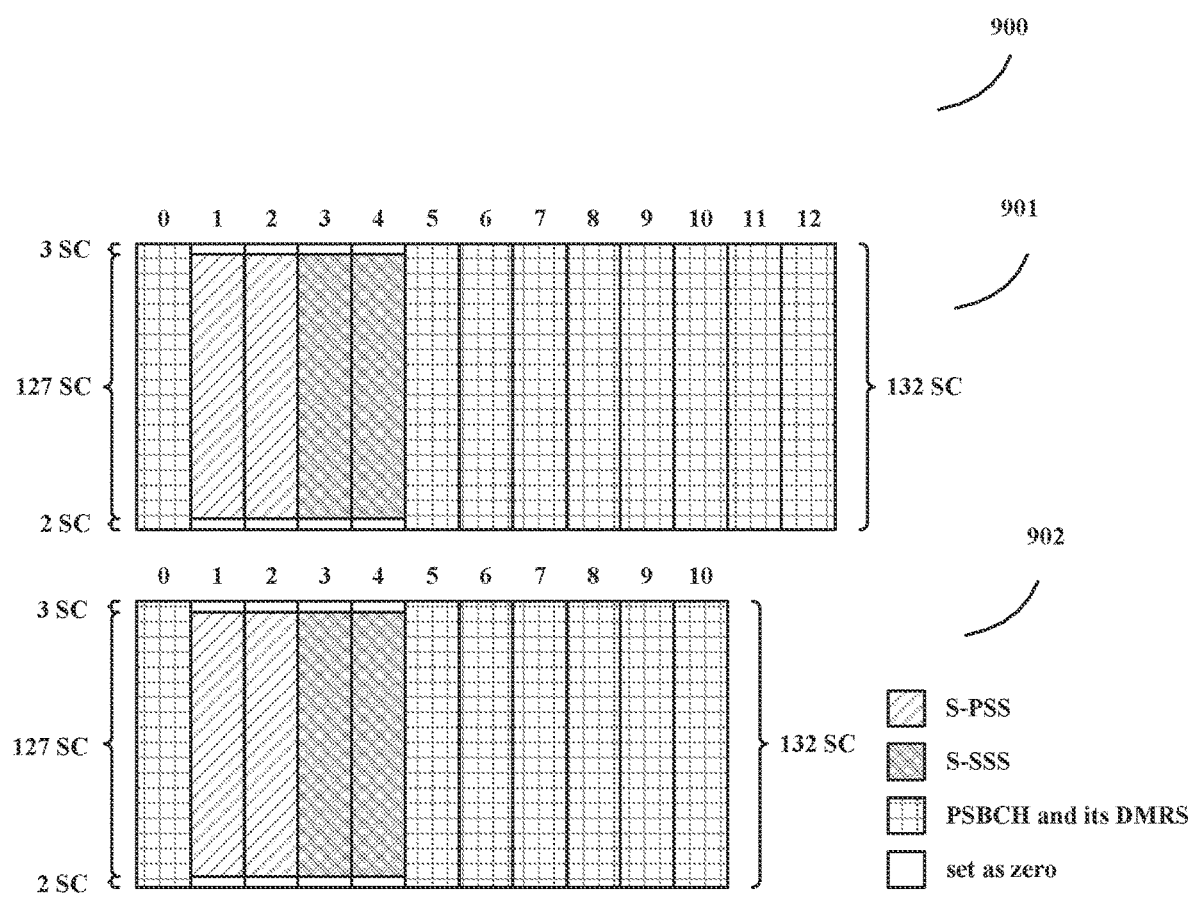
FIG. 9 illustrates an example structure of S-SS/PSBCH block according to embodiments of the present disclosure.

FIG. 9 illustrates an example structure of S-SS/PSBCH block or S-SSB 900 according to embodiments of the present disclosure. An embodiment of the structure of S-SS/PSBCH block 900 shown in FIG. 9 is for illustration only. Other embodiments are used without departing from the scope of the present disclosure.

In NR SL, S-SS/PSBCH block is supported. As illustrated in FIG. 9, one S-SS/PSBCH block consists of 132 contiguous subcarriers (SC) in frequency domain and 14 contiguous symbols for normal CP or 12 contiguous symbols for extended CP in time domain. Within a S-SS/PSBCH block, SL primary synchronization signal (S-PSS) is mapped to symbol #1 and #2, and SL secondary synchronization signal (S-SSS) is mapped to symbol #3 and #4, wherein subcarriers with index 2 to 128 (127 subcarriers in total) are mapped to S-PSS or S-SSS in frequency domain, while subcarriers with index 0, 1, 129, 130, and 131 are set as zero. PSBCH is mapped to symbol #0 and #5 to #$N_{symb}^{S\text{-}SSB}$=1, with DM-RS for PSBCH multiplexed in the symbols, wherein $N_{symb}^{S\text{-}SSB}$=13 for normal CP (901) and $N_{symb}^{S\text{-}SSB}$=11 for extended CP (902). An example resource mapping in time and frequency domain is shown in Table 1.

TABLE 1

Example resource mapping within a S-SS/PSBCH block.

| Signal or channel | Symbol index | Subcarrier index |
| --- | --- | --- |
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S\text{-}SSB}$ − 1 | 0, 1, . . . , 130, 131 |
| DM-RS for PSBCH | 0, 5, 6, . . . , $N_{symb}^{S\text{-}SSB}$ − 1 | 0, 4, . . . , 124, 128 |

On SL, a UE can be configured with a number $N_{period}^{S\text{-}SSB}$ of S-SS/PSBCH blocks to transmit in a period by a pre-configuration or a higher layer parameter (e.g., sl-NumSSB-WithinPeriod), and the transmission of the S-SS/PSBCH blocks in the period is with a fixed periodicity. The UE can determine indexes of slots that include S-SS/PSBCH blocks as $N_{offset}^{S\text{-}SSB}+(N_{interval}^{S\text{-}SSB}+1) \cdot i_{S\text{-}SSB}$, wherein $i_{S\text{-}SSB}$ is the S-SS/PSBCH block index with $0 \leq i_{S\text{-}SSB} \leq N_{period}^{S\text{-}SSB}-1$, $N_{offset}^{S\text{-}SSB}$ is provided by a higher layer parameter (e.g., sl-TimeOffsetSSB) offset and refers to a slot offset from a start of the period to the first slot including S-SS/PSBCH block, and $N_{interval}^{S\text{-}SSB}$ is provided by a higher layer parameter (e.g., sl-TimeInterval) and refers to a slot interval between neighboring S-SS/PSBCH blocks. The above transmission pattern of S-SS/PSBCH blocks is illustrated in FIG. 10.

Figure 10:
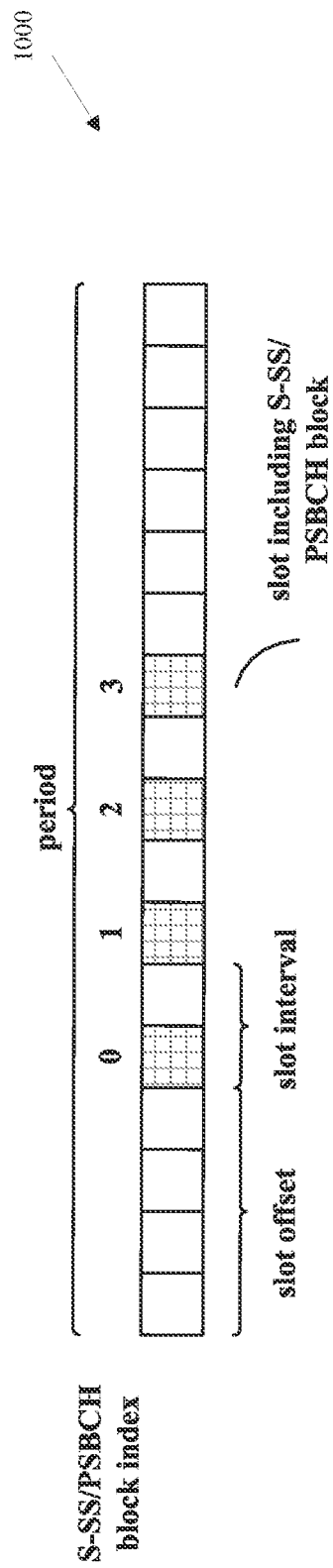
FIG. 10 illustrates an example transmission pattern of S-SS/PSBCH blocks according to embodiments of the present disclosure.

FIG. 10 illustrates an example transmission pattern 1000 of S-SS/PSBCH blocks according to embodiments of the present disclosure. An embodiment of the transmission pattern of S-SS/PSBCH blocks 1000 shown in FIG. 10 is for illustration only. Other embodiments are used without departing from the scope of the present disclosure.

For SL operated over an unlicensed spectrum, the transmission of SL signals and channels may be subject to a channel access procedure, and the transmission happens only when the channel is sensed to be idle in the channel access procedure. The channel access procedure can be also referred to as listen-before-talk (LBT) operation. Due to the uncertainty of the channel access procedure, the transmission of intended S-SS/PSBCH block may be cancelled, and schemes should be supported to compensate the transmission. Various embodiments of this disclosure addresses such enhancement or modification to the transmission pattern of S-SS/PSBCH block, in order to provide additional transmission opportunities for S-SS/PSBCH blocks in a transmission window. For example, additional transmission opportunities can be available by ensuring that there is at least one candidate S-SS/PSBCH block location included in the transmission window or identifying set of slots in the transmission window that can be candidates for transmitting S-SS/PSBCH block or by determining the resource allocation based on the candidate S-SS/PSBCH block in the transmission window or by supporting at least one measurement window for S-SS/PSBCH block or by identifying a set of slots in a measurement window that can be candidates for including a S-SS/PSBCH block to be measured. These mechanisms to improve transmission opportunities can mitigate the transmission failure due to busy channel access procedure.

In one embodiment, there can be a transmission window supported for S-SS/PSBCH block, wherein at least one candidate S-SS/PSBCH block location is included in the transmission window.

In one example, the transmission window can be a set of contiguous slots, e.g., denoted as starting from slot $N_{start}^{TW}$ and ending at slot $N_{end}^{TW}$, with a duration of $N_{duration}^{TW}=N_{end}^{TW}-N_{start}^{TW}+1$ in term of slots (or using $N_{end}^{TW}=N_{duration}^{TW}+N_{start}^{TW}-1$ to determine the ending slot). In another example, the transmission window can be a set of slots including the candidate S-SS/PSBCH block locations, e.g., denoted as starting from slot $N_{start}^{TW}$ and ending at slot $N_{end}^{TW}$, with a duration of $N_{duration}^{S\text{-}SSB}$, wherein $N_{duration}^{S\text{-}SSB}$ is a number of candidate S-SS/PSBCH block locations in the transmission window.

In one example, the transmission window for S-SS/PSBCH blocks is confined within the period including the S-SS/PSBCH blocks, i.e., the starting slot and the ending slot are both confined within the period including the S-SS/PSBCH blocks (e.g., 16 frames).

Figure 11:
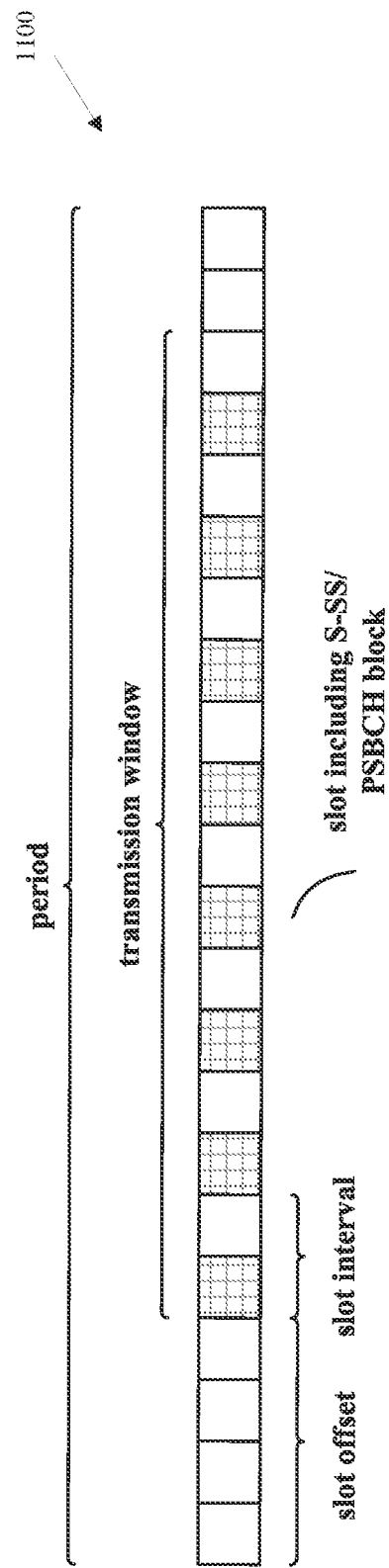
FIG. 11 illustrates an example transmission window for S-SS/PSBCH block according to embodiments of the present disclosure.

FIG. 11 illustrates an example transmission window for S-SS/PSBCH block 1100 according to embodiments of the present disclosure. An embodiment of the transmission window for S-SS/PSBCH block 1100 shown in FIG. 11 is for illustration only. Other embodiments are used without departing from the scope of the present disclosure.

In one embodiment, the parameters for the transmission window of the S-SS/PSBCH block may include at least one of the following parameters, and each parameter can be either fixed in the specification or provided by a pre-configuration or configured by the higher layer parameters. For example, the set of configured parameters for the transmission window for the S-SS/PSBCH block can be denoted as S-SS/PSBCH block transmission timing configuration (S-STTC).

In one embodiment, the parameters for the transmission window for the S-SS/PSBCH block can at least include a duration of the transmission window for the S-SS/PSBCH block (e.g., denoted as $N_{duration}^{TW}$ in the unit of slots or $N_{duration}^{S\text{-}SSB}$ in the unit of number of S-SS/PSBCH blocks).

In one example, the duration of the transmission window for the S-SS/PSBCH block can be provided by a pre-configuration or configured by a higher layer parameter (e.g., as one component in the S-STTC). For instance, the duration of the transmission window for the S-SS/PSBCH block can be (pre-)configured from a set of values or its subset as {1, . . . , 1280}. In another instance, the duration of the transmission window for the S-SS/PSBCH block can be (pre-)configured from a set of values or its subset as {1, . . . , 640}. In yet another instance, UE can assume a default value of the duration of the transmission window for the S-SS/PSBCH block, if the value is not provided by a pre-configuration or by the higher layer parameter. In one sub-instance, the default value can be the maximum value from the set of (pre-)configurable values. In another sub-instance, the default value corresponds to 16 frames in time domain, wherein its value is subject to the SCS applied for the S-SS/PSBCH block.

In another example, the duration of the transmission window for the S-SS/PSBCH block can be fixed.

In yet another example, the duration of the transmission window for the S-SS/PSBCH block (e.g., in term of a number of S-SS/PBCH blocks) is no less than the number of S-SS/PSBCH blocks to transmit in a period provided by a pre-configuration or configured by a higher layer parameter (e.g., sl-NumSSB-WithinPeriod).

In yet another example, the duration of the transmission window for the S-SS/PSBCH block (in term of number of slots) is no less than the product of the number of S-SS/PSBCH blocks to transmit in a period provided by a pre-configuration or configured by a higher layer parameter and the slot interval between neighboring S-SS/PSBCH blocks (e.g., sl-NumSSB-WithinPeriod*(sl-TimeInterval+1)).

In yet another example, the duration of the transmission window for the S-SS/PSBCH block is included in the period including the S-SS/PSBCH blocks (e.g., 16 frames), e.g., the starting slot and ending slot for the transmission window are both included in the period including the S-SS/PSBCH blocks (e.g., 16 frames).

In yet another example, the duration of the transmission window is assumed to be an integer multiple of (sl-TimeInterval+1), in term of slots.

In another embodiment, the parameters for the transmission window for the S-SS/PSBCH block can at least include a periodicity of the transmission window for the S-SS/PSBCH block.

In one example, the periodicity of the transmission window for the S-SS/PSBCH block can be aligned with (e.g., same as) the periodicity of the periodicity of S-SS/PSBCH blocks, such as a fixed value of 16 frames.

In yet another embodiment, the parameters for the transmission window for the S-SS/PSBCH block can at least include an offset between the starting of the period and the starting of the transmission window (e.g., denoted as $N_{offset}^{TW}$, and $N_{offset}^{TW} = N_{start}^{TW}$ for a transmission window in a period).

In one example, the offset can be zero, such that the starting of the transmission window is aligned with the starting of the period containing the S-SS/PSBCH blocks, e.g., $N_{offset}^{TW} = 0$.

In another example, the offset can be identical to the slot offset (e.g., denoted as $N_{offset}^{S-SSB}$) from a start of the period to the first slot including S-SS/PSBCH block provided by a pre-configuration or configured by a higher layer parameter (e.g., sl-TimeOffsetSSB), e.g., $N_{offset}^{TW} = N_{offset}^{S-SSB}$. In this example, the transmission window starts from the first slot including S-SS/PSBCH block in the period including the S-SS/PSBCH block.

In yet another example, the offset can be no larger than the slot offset (e.g., denoted as $N_{offset}^{S-SSB}$) from a start of the period to the first slot including S-SS/PSBCH block configured by a higher layer parameter (e.g., sl-TimeOffsetSSB), e.g., $N_{offset}^{TW} \leq N_{offset}^{S-SSB}$.

Figure 12:
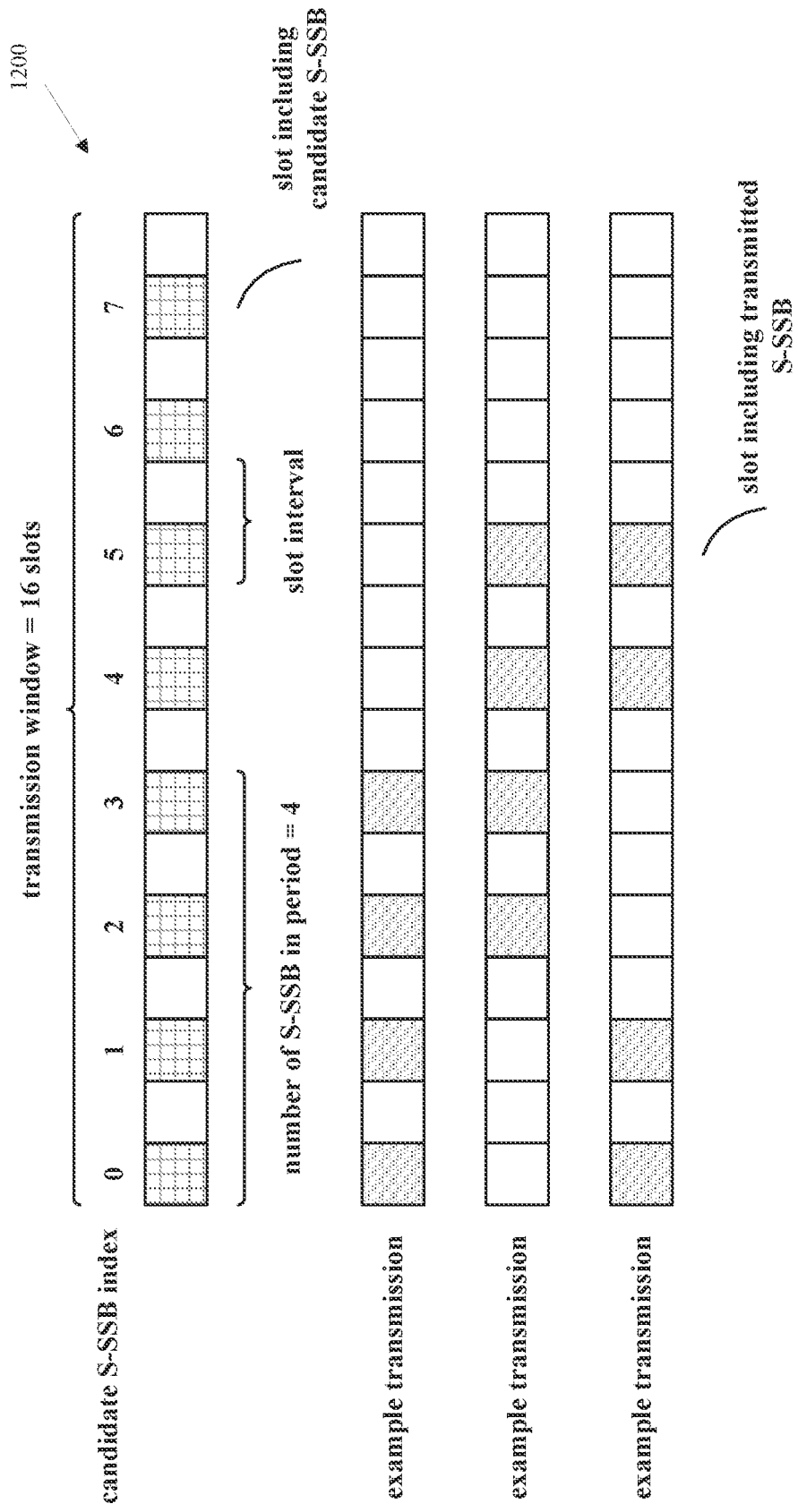
FIG. 12 illustrates an example S-SS/PSBCH block transmission in the transmission window according to embodiments of the present disclosure.

FIG. 12 illustrates an example S-SS/PSBCH block transmission in the transmission window according to embodiments of the present disclosure. An embodiment of the S-SS/PSBCH block transmission in the transmission window 1200 shown in FIG. 12 is for illustration only. Other embodiments are used without departing from the scope of the present disclosure.

In one embodiment, a set of slots in the transmission window can be candidates for transmitting S-SS/PSBCH block.

In one example, the set of slots as candidates for transmitting S-SS/PSBCH block can be determined as $N_{offset}^{TW} + (k+1) \cdot \bar{\iota}_{S-SSB}$, wherein $\bar{\iota}_{S-SSB}$ is the candidate S-SS/PSBCH block index. The minimum value of $\bar{\iota}_{S-SSB}$ is the minimum integer such that $N_{offset}^{TW} + (k+1) \cdot \bar{\iota}_{S-SSB}$ is within the transmission window (e.g., minimum value is 0). The maximum value of $\bar{\iota}_{S-SSB}$ is the maximum integer such that $N_{offset}^{TW} + (k+1) \cdot \bar{\iota}_{S-SSB}$ is within the transmission window (e.g., maximum value is $N_{duration}^{S-SSB} - 1$). k is the interval between neighboring candidate slots for transmitting S-SS/PSBCH block.

In one example, $k = N_{interval}^{S-SSB}$ provided by a pre-configuration or a higher layer parameter (e.g., sl-TimeOffsetSSB). In yet another example, k can be provided by another pre-configuration or another higher layer parameter configured by network, separate from $N_{interval}^{S-SSB}$ provided by a pre-configuration or a higher layer parameter (e.g., sl-TimeOffsetSSB). In yet another example, k is applicable only when the number of candidate slots for transmitting S-SS/PSBCH block in the transmission window is larger than 1.

In another example, the number of slots for candidate S-SS/PSBCH blocks in the transmission window is no less than the configured number of S-SS/PSBCH blocks transmitted in period, e.g. $[N_{duration}^{TW}/(k+1)] \geq N_{period}^{S-SSB}$ or $N_{duration}^{S-SSB} \geq N_{period}^{S-SSB} \geq N_{period}^{S-SSB}$, wherein $N_{period}^{S-SSB}$ is the number of S-SS/PSBCH blocks to transmit in a period provided by a pre-configuration or a higher layer parameter (e.g., sl-NumSSB-WithinPeriod).

In yet another example, there can be a S-SS/PSBCH block index supported (e.g., denoted as $i_{S-SSB}$), wherein the S-SS/PSBCH block index can be determined based on the candidate S-SS/PSBCH block index (e.g., $\bar{\iota}_{S-SSB}$). In yet another embodiment, $i_{S-SSB} = (\bar{\iota}_{S-SSB} \mod n)$ wherein in one example, $n = N_{period}^{S-SSB}$, and in another example, n can be a separate parameter provided by a pre-configuration or configured by a higher layer parameter (e.g., a number of S-SS/PSBCH blocks having different QCL assumption). In yet another embodiment, $i_{S-SSB} = \bar{\iota}_{S-SSB}$, and there is no QCL assumption needed for S-SS/PSBCH block.

In yet another example, there can be QCL assumption supported for S-SS/PSBCH blocks within the transmission window and/or across the transmission window. In one example, S-SS/PSBCH blocks with the same S-SS/PSBCH block index and within the transmission window and/or across the transmission window are assumed to be QCLed. In another example, S-SS/PSBCH blocks at candidate location with candidate S-SS/PSBCH block index $\bar{\iota}_{S-SSB}$ within the transmission window and/or across the transmission window, and corresponding to the same value of ($\bar{\iota}_{S-SSB} \mod n$) are assumed to be QCLed. In one example, $n = N_{period}^{S-SSB}$, and in another example, n can be a separate parameter configured by higher layer parameter (e.g., a number of S-SS/PSBCH blocks having different QCL assumption). In the examples herein, the QCL assumption can be with respect to average gain or quasi co-location 'typeA' and 'typeD' properties.

In yet another example, a UE assumes that within a transmission window, a number of transmitted S-SS/PSBCH blocks is no larger than n. In one example, $n = N_{period}^{S-SSB}$, and in another example, n can be a separate parameter provided by a pre-configuration or configured by higher layer parameter (e.g., a number of S-SS/PSBCH blocks having different QCL assumption).

In yet another example, a UE assumes that within a transmission window a number of transmitted S-SS/PSBCH blocks with a same SS/PSBCH block index is not larger than one.

In one embodiment, the transmission of $N_{period}^{S-SSB}$ S-SS/PSBCH blocks are restricted to slots corresponding to a consecutive number of candidate S-SS/PBCH blocks. In another embodiment, the transmission of $N_{period}^{SSB}$ S-SS/PSBCH blocks are based on the slots including candidate S-SS/PSBCH blocks in the transmission window. In one example, $N_{period}^{S-SSB}$ or at most $N_{period}^{S-SSB}$ out of the slots including candidate S-SS/PSBCH blocks in the transmission window are used for S-SS/PSBCH block transmission, wherein the slots can correspond to a consecutive or non-consecutive number of candidate S-SS/PBCH blocks.

Figure 13:
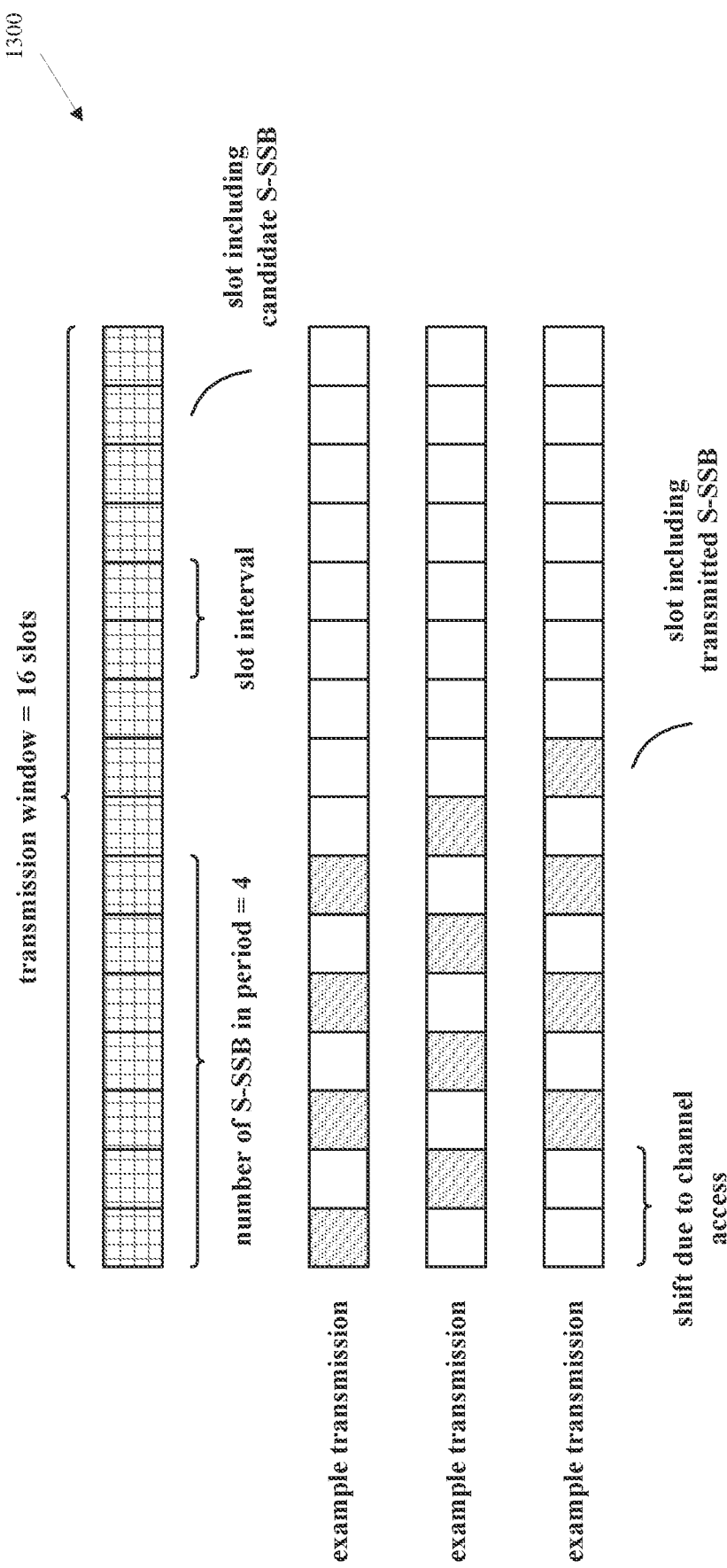
FIG. 13 illustrates another example S-SS/PSBCH block transmission in the transmission window according to embodiments of the present disclosure.

FIG. 13 illustrates another example S-SS/PSBCH block transmission in the transmission window according to embodiments of the present disclosure. An embodiment of the S-SS/PSBCH block transmission in the transmission window 1300 shown in FIG. 13 is for illustration only. Other embodiments are used without departing from the scope of the present disclosure.

In one embodiment, the set of slots as candidates for transmitting S-SS/PSBCH block can be determined as all the slots within the transmission window, wherein the actually transmitted S-SS/PSBCH block(s) are using the pattern with fixed interval (k+1). k is the interval between neighboring candidate slots for transmitting S-SS/PSBCH block. In one example, $k=N_{interval}^{S-SSB}$ provided by higher layer parameter (e.g., sl-TimeOffsetSSB). In another example, k can be another higher layer parameter configured by network, separate from $N_{interval}^{S-SSB}$ provided by higher layer parameter (e.g., sl-TimeOffsetSSB).

In one example, the actually transmitted S-SS/PSBCH blocks in the window are in slots given by $N_{offset}^{TX}+(k+1)\cdot i_{S-SSB}$, wherein $N_{offset}^{TX} \geq N_{offset}^{TW}$ is the slot for transmitting the first S-SS/PSBCH block in the period (e.g., subject to a success of channel access procedure), which can be equivalently expressed as $N_{offset}^{TX}=N_{offset}^{TW}+\Delta N_{offset}^{TX}$ ($\Delta N_{offset}^{TX} \geq 0$), and $i_{S-SSB}$ is the S-SS/PSBCH block index.

In another example, k is applicable only when the number of candidate slots for transmitting S-SS/PSBCH block in the transmission window is larger than 1.

In yet another example, the number of candidate slots for transmitting S-SS/PSBCH block in the transmission window is no less than the configured number of S-SS/PSBCH blocks transmitted in the period, e.g., $\lceil N_{duration}^{TW}/(k+1) \rceil \geq N_{period}^{S-SSB}$, wherein $N_{period}^{S-SSB}$ is the number of S-SS/PSBCH blocks in a period provided by a higher layer parameter (e.g., sl-NumSSB-WithinPeriod).

In one example, a UE assumes that within a transmission window, a number of transmitted S-SS/PSBCH blocks is no larger than $N_{period}^{S-SSB}$. In another example, a UE assumes that within a transmission window a number of transmitted S-SS/PSBCH blocks with a same SS/PSBCH block index is not larger than one.

In another example, actually transmitted S-SS/PSBCH blocks in the window can be in a subset of slots given by $N_{offset}^{TX}+(k+1)\cdot i_{S-SSB}$, wherein whether the corresponding slot is utilized for actual transmission of the S-SS/PSBCH block is subject to the result of channel access procedure.

In yet another embodiment, the transmission can be considered as divided into multiple sub-transmission-windows, wherein each of the sub-transmission-windows used for transmission of a S-SS/PSBCH block within the $N_{period}^{S-SSB}$ number of S-SS/PSBCH blocks. In one example, for S-SS/PSBCH block with index $i_{S-SSB}$, it can be transmitted within a sub-transmission-window from slot $N_{offset}^{S-SSB}+(k+1)\cdot i_{S-SSB}$ to $N_{offset}^{S-SSB}+(k+1)\cdot i_{S-SSB}+N_{duration}^{sub-TW}-1$, wherein $N_{duration}^{sub-TW}$ is the duration for the sub-transmission-window. In one example, $N_{duration}^{sub-TW}$ can be provided by a pre-configuration or configured by the higher layer parameter. In another example, $N_{duration}^{sub-TW}$ can be determined based on the duration of transmission window for all the S-SS/PSBCH blocks $N_{duration}^{sub-TW}$, e.g., $N_{duration}^{sub-TW}=N_{duration}^{TW}-(k+1)\cdot N_{period}^{S-SSB}+1$, or $N_{duration}^{sub-TW}=N_{duration}^{TW}-(k+1)\cdot N_{period}^{S-SSB}+1+k$, wherein the sub-transmission-windows can overlap or do not overlap. In yet another example, $N_{duration}^{sub-TW}$ can be determined based on k, e.g., duration $N_{duration}^{sub-TW}=k+1$, wherein the sub-transmission-windows are non-overlapping.

Figure 14:
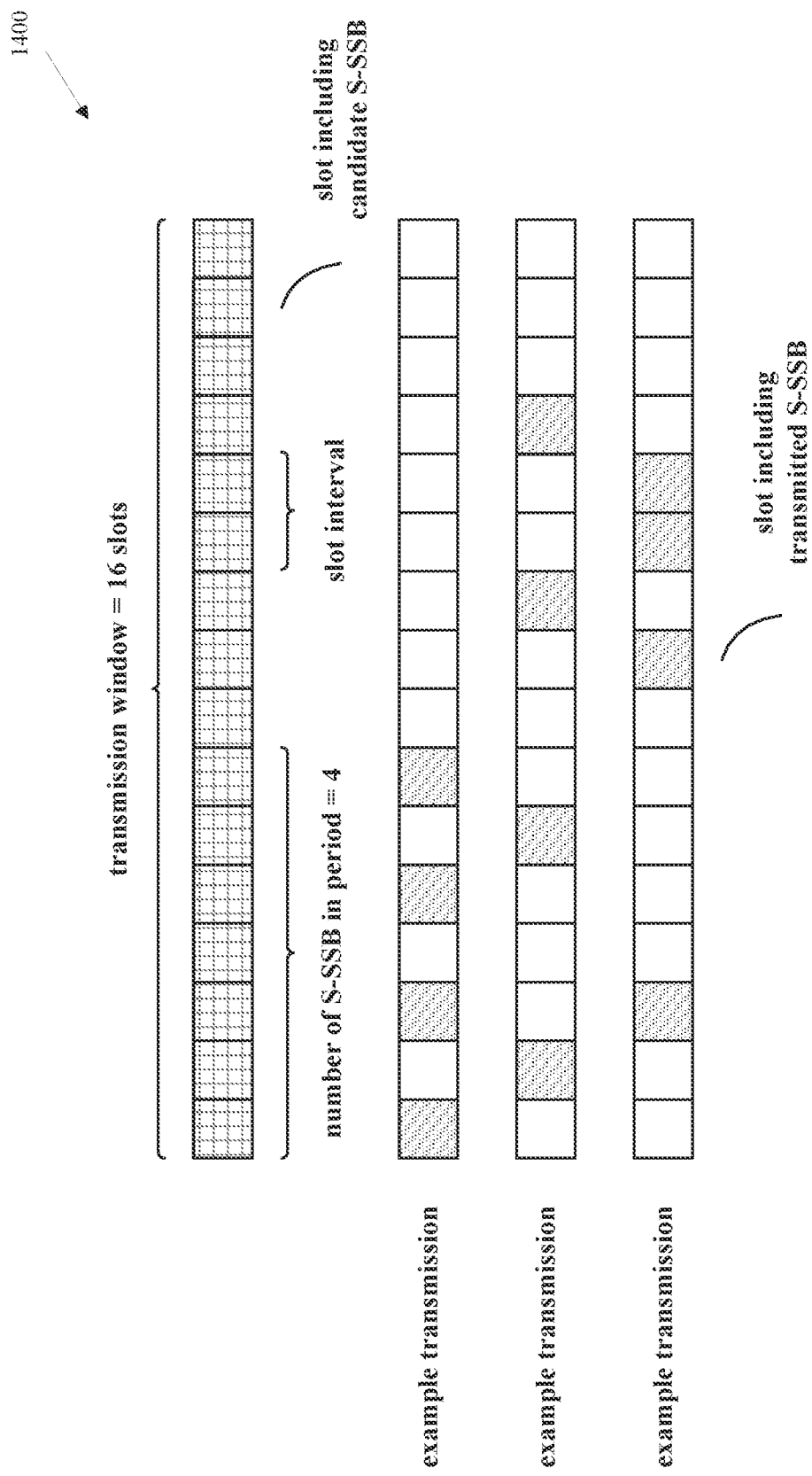
FIG. 14 illustrates yet another example S-SS/PSBCH block transmission in the transmission window according to embodiments of the present disclosure.

FIG. 14 illustrates yet another example S-SS/PSBCH block transmission in the transmission window according to embodiments of the present disclosure. An embodiment of the S-SS/PSBCH block transmission in the transmission window 1400 shown in FIG. 14 is for illustration only. Other embodiments are used without departing from the scope of the present disclosure.

In one embodiment, the set of slots as candidates for transmitting S-SS/PSBCH block can be determined as all the slots within the transmission window, wherein any slot in the transmission window can be used for transmitting a S-SS/PSBCH block.

In another embodiment, there could be a further restriction that the interval between slots for transmitted S-SS/PSBCH block is at least k. In one example, $k=N_{interval}^{S-SSB}$ provided by higher layer parameter (e.g., sl-TimeOffsetSSB). In another example, k can be another higher layer parameter configured by network, separate from $N_{interval}^{S-SSB}$ provided by higher layer parameter (e.g., sl-TimeOffsetSSB). In yet another example, k is applicable only when the number of candidate slots for transmitting S-SS/PSBCH block in the transmission window is larger than 1.

In yet another embodiment, the number of candidate slots for transmitting S-SS/PSBCH block in the transmission window is no less than the configured number of S-SS/PSBCH blocks transmitted in the period, e.g., $\lceil N_{duration}^{TW}/(k+1) \rceil \geq N_{period}^{S-SSB}$, wherein $N_{period}^{S-SSB}$ is the number of S-SS/PSBCH blocks in a period provided by a higher layer parameter (e.g., sl-NumSSB-WithinPeriod).

In one example, a UE assumes that within a transmission window, a number of transmitted S-SS/PSBCH blocks is no larger than $N_{period}^{S-SSB}$.

In yet another embodiment, the transmission can be considered as divided into multiple sub-transmission-windows, wherein each of the sub-transmission-windows used for transmission of a S-SS/PSBCH block within the $N_{period}^{S-SSB}$ number of S-SS/PSBCH blocks. In one example, for S-SS/PSBCH block with index $i_{S-SSB}$, it can be transmitted within a sub-transmission-window from slot $N_{offset}^{S-SSB}+(k+1)\cdot i_{S-SSB}$ to $N_{offset}^{S-SSB}+(k+1)\cdot i_{S-SSB}+N_{duration}^{sub-TW}-1$, wherein $N_{duration}^{sub-TW}$ is the duration for the sub-transmission-window. In another example, $N_{duration}^{sub-TW}$ can be provided by a pre-configuration or configured by the higher layer parameter. In yet another example, $N_{duration}^{sub-TW}$ can be determined based on the duration of transmission window for all the S-SS/PSBCH blocks $N_{duration}^{TW}$, e.g., $N_{duration}^{sub-TW}=N_{duration}^{TW}-(k+1)\cdot N_{period}^{S-SSB}+1$, or $N_{duration}^{sub-TW}=N_{duration}^{TW}-(k+1)\cdot N_{period}^{S-SSB}+1+k$, wherein the sub-transmission-windows can overlap or do not overlap. In yet another example, $N_{duration}^{sub-TW}$ can be determined based on k, e.g., $N_{duration}^{sub-TW}=k+1$, wherein the sub-transmission-windows are non-overlapping.

In one embodiment, when a transmission window for S-SS/PSBCH block is configured, the resource allocation is determined based on the candidate S-SS/PSBCH block(s) in the transmission window.

In one example, for paired spectrum, all the candidate S-SS/PSBCH block locations in the transmission window should be in slots of an UL carrier for transmitting/receiving an S-SS/PSBCH block.

In another example, for unpaired spectrum, all the candidate S-SS/PSBCH block locations in the transmission window should be in slots of which all OFDM symbols semi-statically configured as UL as per the higher layer parameter tdd-UL-DL-ConfigurationCommon of the serving cell if provided or sl-TDD-Configuration-r16 if provided or sl-TDD-Config-r16 of the received PSBCH if provided.

In yet another example, all the slots including candidate S-SS/PSBCH block in the transmission window for S-SS/PSBCH blocks are excluded from the set of slots for a SL resource pool. For instance, in the procedure on determining the applicable set of slots for a SL resource pool, slots in which candidate S-SS/PSBCH block is configured in the transmission window for S-SS/PSBCH blocks are not included in the set of slots for the SL resource pool. For another instance, in the procedure on determining the applicable set of slots for a SL resource pool, slots including candidate S-SS/PSBCH block are not included in the set of slots for the SL resource pool.

In one embodiment, there can be at least one measurement window supported for S-SS/PSBCH block. In one example, the measurement window can be a set of contiguous slots, e.g., denoted as starting from slot $N_{start}^{MW}$ and ending at slot $N_{end}^{MW}$, with a duration of $N_{duration}^{MW} = N_{end}^{MW} - N_{start}^{MW} + 1$ in terms of slots. In another example, the transmission window can be a set of slots including the candidate S-SS/PSBCH block locations, denoted as starting from slot $N_{start}^{MW}$ and ending at slot $N_{end}^{MW}$, with a duration of $N_{duration}^{S-SSB,M}$ wherein $N_{duration}^{S-SSB,M}$ is a number of candidate S-SS/PSBCH block locations in the measurement window. In one example, the measurement window for S-SS/PSBCH blocks is confined within the period including the S-SS/PSBCH blocks (e.g., 16 frames), i.e., the starting slot and the ending slot are both confined within the period including the S-SS/PSBCH blocks (e.g., 16 frames).

In another example, the parameters for the measurement window for the S-SS/PSBCH block can include at least one of the following components, and each parameter can be either fixed in the specification or provided by a pre-configuration or configured by the higher layer parameters. In one example, the set of configured parameters for the measurement window for the S-SS/PSBCH block can be denoted as S-SS/PSBCH block measurement timing configuration (S-SMTC). In another example, the S-SMTC can be separately configured from S-STTC.

In one embodiment, the parameters for the measurement window for the S-SS/PSBCH block can at least include a duration of the measurement window for the S-SS/PSBCH block (e.g., denoted as $N_{duration}^{MW}$ in the unit of slots or $N_{duration}^{S-SSB,M}$ in the unit of number of S-SS/PSBCH blocks). In one example, the duration of the measurement window for the S-SS/PSBCH block can be provided by a pre-configuration or configured by a higher layer parameter (e.g., as one component in the S-SMTC). In one instance, the duration of the measurement window for the S-SS/PSBCH block can be (pre-)configured from a set of values or its subset as $\{1, \ldots, 1280\}$. In another instance, the duration of the measurement window for the S-SS/PSBCH block can be (pre-)configured from a set of values or its subset as $\{1, \ldots, 640\}$.

In another example, the duration of the measurement window for the S-SS/PSBCH block can be fixed. In yet another example, the duration of the measurement widow for the S-SS/PSBCH block is included in the period including the S-SS/PSBCH blocks (e.g., 16 frames), e.g., the starting slot and ending slot for the measurement window are both included in the period including the S-SS/PSBCH blocks (e.g., 16 frames).

In yet another example, the duration of the measurement window for the S-SS/PSBCH block can be the same as the duration of the transmission window for the S-SS/PSBCH block, e.g., the same configuration or fixed value of the duration is applicable for both transmission window and measurement window.

In another embodiment, the parameters for the measurement window for the S-SS/PSBCH block can at least include a periodicity of the measurement window for the S-SS/PSBCH block.

In one example, the periodicity of the measurement window for the S-SS/PSBCH block can be aligned with the periodicity of the periodicity of S-SS/PSBCH blocks, such as a fixed value of 16 frames.

In another example, the periodicity of the measurement window for the S-SS/PSBCH block can be the same as the periodicity of the transmission window for the S-SS/PSBCH block, e.g., the same configuration or fixed value of the periodicity is applicable for both transmission window and measurement window.

In yet another embodiment, the parameters for the measurement window for the S-SS/PSBCH block can at least include an offset between the starting of the period and the starting of the measurement window (e.g., denoted as $N_{offset}^{MW}$, and $N_{offset}^{MW} = N_{start}^{MW}$ for a measurement window in a period).

In one example, the offset can be zero, such that the starting of the measurement window is aligned with the starting of the period containing the S-SS/PSBCH blocks, e.g., $N_{offset}^{MW} = 0$. In another example, the offset can be identical to the slot offset (e.g., denoted as $N_{offset}^{S-SSB}$) from a start of the period to the first slot including S-SS/PSBCH block provided by a pre-configuration or configured by a higher layer parameter (e.g., sl-TimeOffsetSSB), e.g., $N_{offset}^{MW} = N_{offset}^{S-SSB}$. In the example herein, the measurement window starts from the first slot including S-SS/PSBCH block in the period including the S-SS/PSBCH block. In yet another example, the offset can be provided by a pre-configuration, or a separate higher layer parameter configured by the network. In yet another example, the offset of the measurement window for the S-SS/PSBCH block can be the same as the offset of the transmission window for the S-SS/PSBCH block, e.g., the same configuration or fixed value of the offset is applicable for both transmission window and measurement window.

In one embodiment, a set of slots in the measurement window can be candidates for including a S-SS/PSBCH block to be measured. In one example, the measurement window can be associated with a bitmap for indicating the S-SS/PSBCH block to be measured. The set of slots as candidates for including a S-SS/PSBCH block to be measured can be determined as $N_{offset}^{MW} + i_{S-SSB}^{M} + n_{S-SSB}^{M} \cdot j$, wherein $i_{S-SSB}^{M}$ is an index in the bitmap with a value equal to 1, with $0 \leq i_{S-SSB}^{M} \leq n_{S-SSB}^{M} - 1$; $n_{S-SSB}^{M}$ is the bitwidth of the bitmap; j is an integer with $j \geq 0$, and the maximum value of j is the maximum integer such that $N_{offset}^{MW} + i_{S-SSB}^{M} +$ $n_{S\text{-}SSB}^{M} \cdot j$ is within the measurement window. In one example, when a bit in the bitmap with index $i_{S\text{-}SSB}^{M}$ takes a value of 1, the UE performs a measurement based on candidate slots $N_{offset}^{MW} + i_{S\text{-}SSB}^{M} + n_{S\text{-}SSB}^{M} \cdot j$ (with all possible value of j). In another example, when a bit in the bitmap with index $i_{S\text{-}SSB}^{M}$ takes a value of 0, the UE doesn't need to perform a measurement based on candidate slots $N_{offset}^{MW} + i_{S\text{-}SSB}^{M} + n_{S\text{-}SSB}^{M} \cdot j$ (with all possible value of j).

In yet another example, the UE can assume for a given value of $i_{S\text{-}SSB}^{M}$, the candidate slots $N_{offset}^{MW} + i_{S\text{-}SSB}^{M} + n_{S\text{-}SSB}^{M} \cdot j$ (with all possible value of j) are QCLed. In yet another example, the UE can assume for a given value of $i_{S\text{-}SSB}^{M}$, at most one S-SS/PSBCH block is transmitted in the candidate slots $N_{offset}^{MW} + i_{S\text{-}SSB}^{M} + n_{S\text{-}SSB}^{M} \cdot j$ (with all possible value of j).

In another embodiment, the measurement window can be associated with a bitmap for indicating the S-SS/PSBCH block to be measured. The set of slots as candidates for including a S-SS/PSBCH block to be measured can be determined as $N_{offset}^{MW} + i_{S\text{-}SSB}^{M} + n_{S\text{-}SSB}^{M} \cdot j$, wherein $i_{S\text{-}SSB}^{M}$ is an index in the bitmap with a value equal to 1, with $0 \leq i_{S\text{-}SSB}^{M} \leq n_{S\text{-}SSB}^{M} - 1$; $n_{S\text{-}SSB}^{M}$ is provided by a higher layer parameter; j is an integer with $j \geq 0$, and the maximum value of j is the maximum integer such that $N_{offset}^{MW} + i_{S\text{-}SSB}^{M} + n_{S\text{-}SSB}^{M} \cdot j$ is within the measurement window. In one example, when a bit in the bitmap with index $i_{S\text{-}SSB}^{M}$ takes a value of 1, the UE performs a measurement based on candidate slots $N_{offset}^{MW} + i_{S\text{-}SSB}^{M} + n_{S\text{-}SSB}^{M} \cdot j$ (with all possible value of j). In another example, when a bit in the bitmap with index $i_{S\text{-}SSB}^{M}$ takes a value of 0, the UE doesn't need to perform a measurement based on candidate slots $N_{offset}^{MW} + i_{S\text{-}SSB}^{M} + n_{S\text{-}SSB}^{M} \cdot j$ (with all possible value of j).

In yet another example, the UE can assume for a given value of $i_{S\text{-}SSB}^{M}$, the candidate slots $N_{offset}^{MW} + i_{S\text{-}SSB}^{M} + n_{S\text{-}SSB}^{M} \cdot j$ (with all possible value of j) are QCLed. In yet another example, the UE can assume for a given value of $i_{S\text{-}SSB}^{M}$, at most one S-SS/PSBCH block is transmitted in the candidate slots $N_{offset}^{MW} + i_{S\text{-}SSB}^{M} + n_{S\text{-}SSB}^{M} \cdot j$ (with all possible value of j).

In yet another embodiment, the measurement window can be associated with a slot interval for indicating the S-SS/PSBCH block to be measured. The set of slots as candidates for including a S-SS/PSBCH block to be measured can be determined as $N_{offset}^{MW} + (k^{M}+1) \cdot \bar{\imath}_{S\text{-}SSB}$, wherein $\bar{\imath}_{S\text{-}SSB}^{M}$ is the candidate S-SS/PSBCH block index in the measurement window. In one example, the minimum value of $\bar{\imath}_{S\text{-}SSB}^{M}$ is the minimum integer such that $N_{offset}^{MW} + (k^{M}+1) \cdot \bar{\imath}_{S\text{-}SSB}^{M}$ is within the measurement window (e.g., minimum value is 0) and the maximum value of $\bar{\imath}_{S\text{-}SSB}^{M}$ is the maximum integer such that $N_{offset}^{MW} + (k^{M}+1) \cdot \bar{\imath}_{S\text{-}SSB}$ is within the measurement window (e.g., maximum value is $N_{duration}^{S\text{-}SSB,M} - 1$). $k^{M}$ is the interval between neighboring candidate slots for measuring S-SS/PSBCH block. In one example, $k^{M} = N_{interval}^{S\text{-}SSB}$ provided by higher layer parameter (e.g., sl-TimeOffsetSSB). In another example, $k^{M}$ can be another higher layer parameter configured by network, separate from $N_{interval}^{S\text{-}SSB}$ provided by higher layer parameter (e.g., sl-TimeOffsetSSB). In yet another example, $k^{M}$ is applicable only when the number of candidate slots for measuring S-SS/PSBCH block in the measurement window is larger than 1.

In one embodiment, there can be a S-SS/PSBCH block index supported (e.g., denoted as $i_{S\text{-}SSB}$), wherein the S-SS/PSBCH block index can be determined based on the candidate S-SS/PSBCH block index (e.g., $\bar{\imath}_{S\text{-}SSB}^{M}$). In one instance, $i_{S\text{-}SSB} = (\bar{\imath}_{S\text{-}SSB}^{M} \mod n)$, wherein in one example, $n = N_{period}^{S\text{-}SSB}$, and in another example, n can be a separate parameter configured by higher layer parameter (e.g., a number of S-SS/PSBCH blocks having different QCL assumption).

In another embodiment, there can be QCL assumption supported for S-SS/PSBCH blocks within the measurement window and/or across the measurement window. In one example, S-SS/PSBCH blocks with the same S-SS/PSBCH block index and within the measurement window and/or across the measurement window are assumed to be QCLed. In another example, S-SS/PSBCH blocks at candidate location with candidate S-SS/PSBCH block index $\bar{\imath}_{S\text{-}SSB}^{M}$ within the measurement window and/or across the measurement window and corresponding to the same value of $(\bar{\imath}_{S\text{-}SSB}^{M} \mod n)$ are assumed to be QCLed, wherein in one example, $n = N_{period}^{S\text{-}SSB}$, and in another example, n can be a separate parameter configured by higher layer parameter (e.g., a number of S-SS/PSBCH blocks having different QCL assumption). In the examples herein, the QCL assumption can be with respect to average gain, quasi co-location 'typeA' and 'typeD' properties.

In one embodiment, a UE assumes that within a measurement window a number of transmitted S-SS/PSBCH blocks with a same SS/PSBCH block index is not larger than one.

In another embodiment, the measurement window can be associated with a slot interval for indicating the S-SS/PSBCH block to be measured. The set of slots as candidates for including a S-SS/PSBCH block to be measured can be determined as $N_{offset}^{MW} + (k^{M}+1) \cdot \bar{\imath}_{S\text{-}SSB}^{M}$, wherein $\bar{\imath}_{S\text{-}SSB}^{M}$ is the candidate S-SS/PSBCH block index in the measurement window. In one example, the minimum value of $\bar{\imath}_{S\text{-}SSB}^{M}$ is the minimum integer such that $N_{offset}^{MW} + (k^{M}+1) \cdot \bar{\imath}_{S\text{-}SSB}^{M}$ is within the measurement window and the maximum value of $\bar{\imath}_{S\text{-}SSB}^{M}$ is the maximum integer such that $N_{offset}^{MW} + (k^{M}+1) \cdot \bar{\imath}_{S\text{-}SSB}^{M}$ is within the measurement window. $k^{M}$ is the interval between neighboring candidate slots for measuring S-SS/PSBCH block. In one example, $k^{M} = N_{interval}^{S\text{-}SSB}$ provided by higher layer parameter (e.g., sl-TimeOffsetSSB). In another example, $k^{M}$ can be another higher layer parameter configured by network, separate from $N_{interval}^{S\text{-}SSB}$ provided by higher layer parameter (e.g., sl-TimeOffsetSSB). In yet another example, $k^{M}$ is applicable only when the number of candidate slots for measuring S-SS/PSBCH block in the measurement window is larger than 1.

In yet another embodiment, there can be QCL assumption supported for S-SS/PSBCH blocks within the measurement window and/or across the measurement window. In one example, S-SS/PSBCH blocks with slot index provided by $N_{offset}^{MW} + (k^{M}+1) \cdot \bar{\imath}_{S\text{-}SSB}^{M}$ and within the measurement window and/or across the measurement window are assumed to be QCLed.

In one embodiment, a UE assumes that within a measurement window a number of transmitted S-SS/PSBCH blocks is not larger than one. In another embodiment, the measurement window can be associated with a slot interval for indicating the S-SS/PSBCH block to be measured. The set of slots as candidates for including a S-SS/PSBCH block to be measured can be determined as $N_{offset}^{MW} + (k^{M}+1) \cdot i_{S\text{-}SSB}^{M}$, wherein $i_{S\text{-}SSB}^{M}$ is the S-SS/PSBCH block index, $k^{M}$ is the interval between neighboring candidate slots for measuring S-SS/PSBCH block, and $N_{offset}^{M}$ is the offset that the UE applies for measurement, wherein $N_{offset}^{M} \geq N_{offset}^{MW}$. In one example, $k^{M} = N_{interval}^{S\text{-}SSB}$ provided by higher layer parameter (e.g., sl-TimeOffsetSSB). In another example, $k^{M}$ can be another higher layer parameter configured by network, separate from $N_{interval}^{S\text{-}SSB}$ provided by higher layer parameter (e.g., sl-TimeOffsetSSB). In yet another example, $k^{M}$ is applicable only when the number of candidate slots for measuring S-SS/PSBCH block in the measurement window is larger than 1.

In another embodiment, the measurement window can be associated with a slot interval for indicating the S-SS/PSBCH block to be measured. The UE assumes the interval between neighboring candidate slots for measuring S-SS/PSBCH block is at least $k^M$. In one example, $k^M = N_{interval}^{S-SSB}$ provided by higher layer parameter (e.g., sl-TimeOffsetSSB). In another example, $k^M$ can be another higher layer parameter configured by network, separate from $N_{interval}^{S-SSB}$ provided by higher layer parameter (e.g., sl-TimeOffsetSSB).

In yet another embodiment, the UE measures all the candidate S-SS/PSBCH blocks within the measurement window. In yet another embodiment, the UE measures at most one S-SS/PSBCH block within the measurement window.

Figure 15:
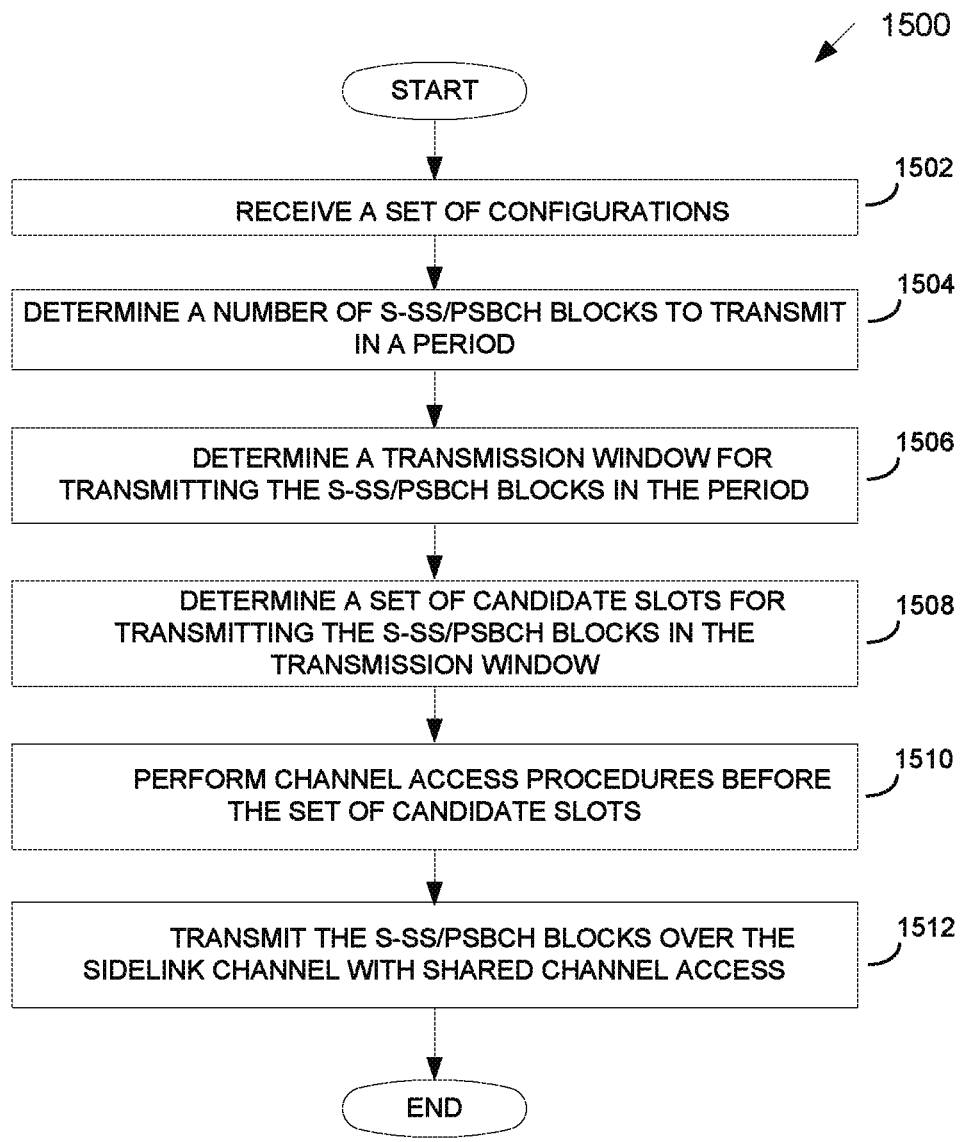
FIG. 15 illustrates a flowchart of a method for an operation of UE to transmit S-SS/PSBCH block according to embodiments of the present disclosure.

FIG. 15 illustrates a flowchart of a method for transmission of S-SS/PSBCH block according to embodiments of the present disclosure, as may be performed by a UE (e.g., 111-116 as illustrated in FIG. 1). An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15, the method 1500 begins at step 1502. In step 1502, the UE receives a set of configurations. In step 1504, the UE determines, based on the set of configurations, a number $N_{period}^{S-SSB}$ of S-SS/PSBCH blocks to transmit in a period. In step 1506, the UE determines, based on the set of configurations, a transmission window for transmitting the S-SS/PSBCH blocks in the period.

In one embodiment, the transmission window for transmitting the S-SS/PSBCH block includes one of a periodicity fixed as 16 frames, an offset $N_{offset}^{S-SSB}$ determined from the set of configurations, or a duration $N_{duration}^{S-SSB}$ determined from the set of configurations, or an interval $N_{interval}^{S-SSB}$ determined from the set of configurations.

In step 1508, the UE determines a set of candidate slots for transmitting the S-SS/PSBCH blocks in the transmission window. In one example, the set of candidate slots for transmitting the S-SS/PSBCH blocks in the transmission window are determined as $N_{offset}^{S-SSB} + (N_{interval}^{S-SSB}+1) \cdot \bar{i}_{S-SSB}$, where $\bar{i}_{S-SSB}$ is a candidate S-SS/PSBCH block index with $0 \leq \bar{i}_{SSSB} \leq N_{duration}^{S-SSB}-1$. In another example, the set of candidate slots for transmitting the S-SS/PSBCH blocks in the transmission window are not included in a SL resource pool. In yet another example, a number of the set of candidate slots for transmitting the S-SS/PSBCH blocks in the transmission window is no less than the number of S-SS/PSBCH blocks to transmit in the period.

In step 1510, the UE performs channel access procedures before the set of candidate slots for transmitting the S-SS/PSBCH blocks in the transmission window. Upon successfully performing the channel access procedures, in step 1512, the UE transmits to another UE, the S-SS/PSBCH blocks over a SL channel with shared channel access. In one example, a number of transmitted S-SS/PSBCH blocks in the transmission window is no larger than the number of S-SS/PSBCH blocks to transmit in the period.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims.

What is claimed is:

1. A user equipment (UE) in a wireless communication system, the UE comprising:
a transceiver configured to receive (i) first information on a number of at least one candidate sidelink synchronization signals and physical sidelink broadcast channel (S-SS/PSBCH) block occasion for a slot including a S-SS/PSBCH block and (ii) second information on a slot gap for the at least one candidate S-SS/PSBCH block occasion; and
a processor operably coupled to the transceiver, the processor configured to identify at least one slot including the at least one candidate S-SS/PSBCH block occasion based on an offset associated with the S-SS/PSBCH block, the slot gap, and at least one index of the at least one candidate S-SS/PSBCH block occasion,
wherein the transceiver is further configured to perform a sidelink communication on a shared spectrum based on the S-SS/PSBCH block,
wherein the sidelink communication on the shared spectrum is performed based on a set of slots of a sidelink resource pool, and
wherein the set of slots of the sidelink resource pool does not include the at least one slot including the at least one candidate S-SS/PSBCH block occasion.

2. The UE of claim 1, wherein a number of candidate slots from the set of slots is not less than a number of S-SS/PSBCH blocks to transmit.

3. The UE of claim 1, wherein the first information and the second information are received via a higher layer signaling.

4. The UE of claim 1, wherein indexes of slots including the S-SS/PSBCH block are determined according to:

$$N_{offset}^{S-SSB} + (N_{interval}^{S-SSB}+1) \cdot \bar{i}_{S-SSB},$$

where the $N_{offset}^{S-SSB}$ denotes an offset of a first slot including the S-SS/PSBCH block, the $N_{interval}^{S-SSB}$ denotes a slot interval for the slots including the S-SS/PSBCH block $\bar{i}_{S-SSB}$ denotes an index of the S-SS/PSBCH block.

5. The UE of claim 1, wherein the processor is configured to:
determine a measurement window for measuring S-SS/PSBCH blocks in a period;
determine a set of candidate slots for measuring the S-SS/PSBCH blocks in the measurement window; and
perform measurement based on the S-SS/PSBCH blocks in the set of candidate slots for measuring the S-SS/PSBCH blocks in the measurement window.

6. The UE of claim 5, wherein the measurement window for measuring the S-SS/PSBCH blocks is based on at least one of:
a periodicity fixed as 16 frames;
an offset $N_{offset}^{S-SSB}$ determined from the first information;
a duration $N_{duration}^{S-SSB,M}$ determined from first information; and an interval $N_{interval}^{S\text{-}SSB}$ determined from the first information.

7. The UE of claim 5, wherein the set of candidate slots for measuring the S-SS/PSBCH blocks in the measurement window is determined as $N_{offset}^{S\text{-}SSB} + (N_{interval}^{S\text{-}SSB}+1) \cdot \bar{i}_{S\text{-}SSB}^{M}$, where $\bar{i}_{S\text{-}SSB}^{M}$ is a candidate S-SS/PSBCH block index with $0 \leq \bar{i}_{S\text{-}SSB}^{M} \leq N_{duration}^{S\text{-}SSB,M}-1$.

8. The UE of claim 5, wherein the measurement based on the S-SS/PSBCH blocks is performed at most once in the measurement window.

9. A method of a user equipment (UE) in a wireless communication system, the method comprising:
receiving (i) first information on a number of at least one candidate sidelink synchronization signals and physical sidelink broadcast channel (S-SS/PSBCH) block occasion for a slot including a S-SS/PSBCH block and (ii) second information on a slot gap for the at least one candidate S-SS/PSBCH block occasion;
identifying at least one slot including the at least one candidate S-SS/PSBCH block occasion based on an offset associated with the S-SS/PSBCH block, the slot gap, and at least one index of the at least one candidate S-SS/PSBCH block occasion; and
performing a sidelink communication on a shared spectrum based on the S-SS/PSBCH block,
wherein the sidelink communication on the shared spectrum is performed based on a set of slots of a sidelink resource pool, and
wherein the set of slots of the sidelink resource pool does not include the at least one slot including the at least one candidate S-SS/PSBCH block occasion.

10. The method of claim 9, wherein a number of candidate slots from the set of slots is no less than a number of S-SS/PSBCH blocks to transmit.

11. The method of claim 9, wherein the first information and the second information are received via a higher layer signaling.

12. The method of claim 9, wherein indexes of slots including the S-SS/PSBCH block are determined according to:

$$N_{offset}^{S\text{-}SSB} + (N_{interval}^{S\text{-}SSB}+1) \cdot \bar{i}_{S\text{-}SSB},$$

where the $N_{offset}^{S\text{-}SSB}$ denotes an offset of a first slot including the S-SS/PSBCH block, the $N_{interval}^{S\text{-}SSB}$ denotes a slot interval for the slots including the S-SS/PSBCH block $\bar{i}_{S\text{-}SSB}$ denotes an index of the S-SS/PSBCH block.

13. The method of claim 9, further comprising:
determining a measurement window for measuring S-SS/PSBCH blocks in a period;
determining a set of candidate slots for measuring the S-SS/PSBCH blocks in the measurement window; and
performing measurement based on the S-SS/PSBCH blocks in the set of candidate slots for measuring the S-SS/PSBCH blocks in the measurement window.

14. The method of claim 13, wherein the measurement window for measuring the S-SS/PSBCH blocks is based on at least one of:
a periodicity fixed as 16 frames;
an offset $N_{offset}^{S\text{-}SSB}$ determined from the first information;
a duration $N_{duration}^{S\text{-}SSB,M}$ determined from first information; and
an interval $N_{interval}^{S\text{-}SSB}$ determined from the first information.

15. The method of claim 13, wherein the set of candidate slots for measuring the S-SS/PSBCH blocks in the measurement window are determined as $N_{offset}^{S\text{-}SSB} + (N_{interval}^{S\text{-}SSB}+1) \cdot \bar{i}_{S\text{-}SSB}^{M}$, where $\bar{i}_{S\text{-}SSB}^{M}$ is a candidate S-SS/PSBCH block index with $0 \leq \bar{i}_{S\text{-}SSB}^{M} \leq N_{duration}^{S\text{-}SSB,M}-1$.

16. The method of claim 13, wherein the measurement based on the S-SS/PSBCH blocks is performed at most once in the measurement window.

* * * * *